Figure 1:
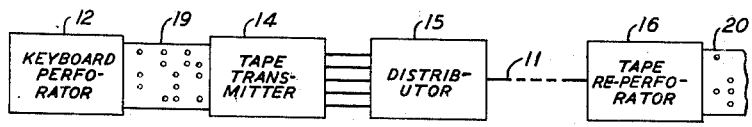

May 10, 1938. A. BAILEY ET AL 2,117,052

TELEGRAPH TAPE COMPARATOR

Filed Oct. 7, 1936

INVENTORS: A. BAILEY
T. A. McCANN
BY
ATTORNEY

Patented May 10, 1938

2,117,052

UNITED STATES PATENT OFFICE 2,117,052

TELEGRAPH TAPE COMPARATOR

Austin Bailey, Maplewood, and Thomas Addison McCann, Denville, N. J., assignors to American Telephone and Telegraph Company, a corporation of New York Application October 7, 1936, Serial No. 104,510

8 Claims. (Cl. 178—69)

This invention relates to printing communication systems and more particularly to teletypewriter transmission testing circuit arrangements.

An object of this invention is to automatically count the number of errors that are introduced by transmitting telegraph code signals over some types of transmission circuits.

Another object of the invention is to automatically record the number of times characters or character spaces are omitted in a recorded message received over a transmission circuit. It is accomplished by comparing the punchings in a perforated receiving tape with the corresponding punchings in the tape used at the sending end of a printing communication system wherein teletypewriters are employed.

A further object is to provide a method of determining the effectiveness of a transmission system.

In radio transmission it is often necessary to make a comparison of a transmitted and a received copy of a message on punched teletypewriter tape, to determine accurately the percentage of errors resulting from transmission. The method of evaluating a transmission medium intended for teletypewriter use is of particular convenience in tests on radio circuits, where transmission may be affected by random occurrences, such as noise and fading. In earlier tests the received copy typed by the receiving machine was visually compared with the typed record made at the sending terminal. By such a comparison, however, inaccuracies are frequently introduced for a number of reasons, the most important of which is that many of the transmitted "stunt" characters, such as figure shift, letter shift, or carriage return signals are not necessarily indicated on either the transmitted or received copies. Two of said signals, for example, might be sent in sequence without affecting the typed copy.

According to the present invention it is possible to obtain a more accurate comparison of the sent and the received signal by a method using a reperforator to put the received signals in the form of a perforated tape. This tape is then compared automatically with the perforated tape or a copy thereof, used at the sending end. Besides avoiding a great amount of tedious comparison by reading, this method increases the accuracy since all signals sent, except those obliterated during transmission, will appear on the receiving tape. The comparison of tape is made automatically by the use of two standard tape transmitters of the type used for sending signals of the Baudot code and a circuit that effects the counting of the number of times the punchings on the two tapes run through the two transmitters operating in synchronism, differ from each other. Corresponding characters or character spaces on the two tapes are respectively brought into engagement with the contact fingers of the transmitters simultaneously. The two transmitters have their corresponding contact fingers connected together and the bus-bars of each transmitter are respectively connected to battery and ground, the latter connection extending through the winding of a control relay. If a contact finger of one transmitter is connected to the battery bus-bar while the corresponding contact finger of the other transmitter is connected to ground, a current will flow and the control relay will operate, and in doing so will complete another circuit which extends through the winding of a counting magnet. The corresponding character punchings on the two tapes passing simultaneously through the two transmitters will cause the operation of the counting magnet whereby a count of the number of inaccuracies in recording the received characters is made. So long as the corresponding sets of punchings on the two tapes are alike, the corresponding contact fingers on the two transmitters will either be connected to the ground bus-bars, or to the battery bus-bars and the operating circuit for the control relay will not be connected from the battery, through the tape transmitters to the control relay and ground. Whenever dissimilar characters occur in the tape transmitters on one or more of the contact fingers then one tape transmitter will be connected to the ground bus-bar while the corresponding contact finger in the other tape transmitter is connected to the battery bus-bar. A circuit is thereby completed from battery through the battery bus-bar on one tape transmitter, the contact fingers resting thereon, to the corresponding contact fingers in the other tape transmitter which due to dissimilarity of the characters rest on the ground bus-bar, through the control relay to ground. An error is thus counted and recorded by operation of the electromagnetic counter associated with one of the control relay contact circuits. A signal omitted on the receiving tape will cause the two tapes to be out of step and thereby result in a continuous sequence of errors. To indicate this, a stepper selector switch is provided, which after five consecutive errors have been recorded will stop the comparator and ring a bell. The selector switch is operated through a stepping and a release magnet connected to a second armature on the control relay. An essential part of the circuit is a relay of the slow-release type which operates with each pulse sent to the operating magnets of the two transmitters. The slow-release relay allows sufficient time for the control relay to operate before the circuit is extended through to the stepping and release magnets of the selector switch. A key has been provided to make it possible to stop the tape after each error when it is desired to examine each one for the purpose of determining which of the selecting pulses of the character have been received in error. This key is connected between the contacts of step No. 1 on the selector switch and the relay for operating a bell signal. A restoring key is also provided to release the selector switch and start the transmitters after they have stopped through action of the selector.

Figure 2:
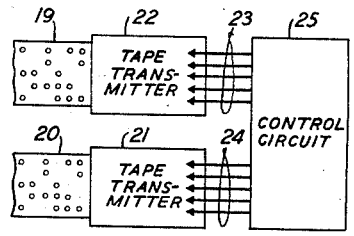
Figure 3:
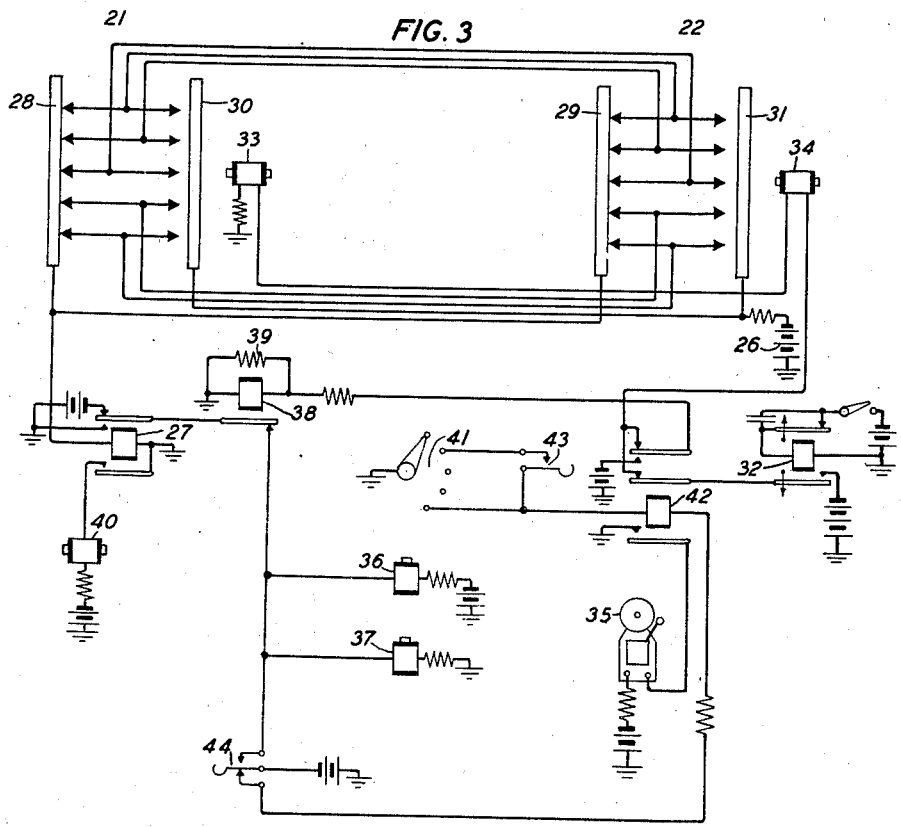

A better understanding of the invention may be had from the following detailed description and appended claims taken in conjunction with the accompanying drawing of which, Figure 1 shows a diagrammatic layout of a teletypewriter system wherein a tape transmitter is employed at the sending end and a reperforator at the receiving end;

Fig. 2 represents the nucleus of the invention wherein two tape transmitters are arranged to operate simultaneously and in synchronism to close operating circuits through the control circuit whenever dissimilar perforations occur simultaneously in the two tape transmitters and Fig. 3 shows a schematic circuit arrangement of the invention.

Like parts have similar reference characters.

Referring to Fig. 1 of the drawing the equipment shown to the left of transmission circuit 11 is that at the sending end and that shown to the right is the equipment at the receiving end. Rectangles 12, 14 and 15 are a keyboard tape perforator, a tape transmitter and a distributor, respectively. Rectangle 16 is a tape reperforator. The keyboard tape perforator, tape transmitter, distributor and tape reperforator may be any of the types well known in the art. The keyboard perforator may be of the type disclosed in U. S. Patent 1,420,931 granted to E. E. Kleinschmidt on June 29, 1922. The tape transmitter and distributor may be of the type disclosed in U. S. Patent 1,566,295 granted to E. F. Watson on December 22, 1925. The tape reperforator may be of the type disclosed in U. S. Patent 1,799,214 granted to A. A. Clokey on April 7, 1931.

The punched tape 19, or a copy thereof, produced by keyboard perforator 12 is then conveyed to the tape comparator shown diagrammatically in Fig. 2 and there compared with the punched tape 20 produced by reperforator 16. The method and means of bringing the two punched tapes together may be by any one of several, such as by personal delivery, mail, express or in any way so that the two tapes are bought together for a test. The purpose of the comparator is to make tests over a transmission line from time to time and in order to do this according to the present invention it is necessary that certain sections of the transmitting punched tape containing special test messages, are shipped to the receiving office whereat each section of shipped punched tape may be compared with a section of tape containing a punched record of the corresponding special message as received at the receiving station over a transmission medium. Any difference between the punching on the transmitting tape and the punching on the receiving tape will be recorded to determine the quality of transmission over the transmission medium. The comparator comprises two tape transmitters 21 and 22 which are of the type disclosed in U. S. Patent 2,055,567, granted to E. F. Watson, on Sept. 29, 1936. Conductor groups 23 and 24 respectively connect the finger contact groups of transmitters 21 and 22 to a control circuit diagrammatically represented by rectangle 25. When differences occur in the corresponding sets of punchings shown in tapes 19 and 20, operating circuits are closed by corresponding fingers of the transmitters 21 and 22 to effect the operation of the control circuit which, in turn, operates the counting mechanism as will be hereinafter described.

Referring to Fig. 3 which shows the schematic arrangement of the comparator, or testing circuit, and two tape transmitters 21 and 22 adapted for sending messages of the Baudot code, each transmitter has five or, in some cases, six contact fingers, in engageable relation with two bus-bars. One bus-bar of each transmitter is connected to grounded battery 26 and the other to ground through the winding of control relay 27. Bus-bars 28 and 29 are connected in parallel to the winding of control relay 27 and bus-bars 30 and 31 are connected in parallel to grounded battery 26. It is necessary in order to make use of the present invention to use reperforator 16 at the receiving end of the radio or wire transmission system in order to have the received copy in the form of perforated tape. Whenever desired the received perforated tape may be passed through one of the transmitters, say, transmitter 21 which is being referred to hereinafter as the receiving transmitter, while a perforated tape copy of the message as it was originally transmitted at the other end of the system is passed through the other of the transmitters, say transmitter 22 which is referred to hereinafter as the sending transmitter. The transmitters 21 and 22 are driven in synchronism by a vibrating relay 32 of the slow-release type, which may be arranged to send about 300 pulses per minute into the operating or stepping magnets 33 and 34 over an obvious operating circuit. When these magnets release, five contact fingers, referred to hereinafter as fingers, on each of transmitters 21 and 22 are actually driven upward beneath the tape and not to the right as shown on the drawing. They either make or fail to make contacts with their respective battery bus-bars 30 and 31, depending on the perforation patterns on the respective tapes. At the next operation of the magnets, the fingers return and the tapes are moved ahead bringing the next row of perforations over the fingers. Ordinarily when the transmitters are used for actual transmission, the fingers thereof are wired to a distributor which sends the proper sequence of pulses over the line, but when used in the present invention, as for example, for the comparison of tapes, these contact fingers on one transmitter are respectively wired to their corresponding fingers on the other transmitter as shown in the drawing. The five fingers are indicated in the drawing by straight lines with arrows at each end and if—when the magnets release—a finger is opposite a hole in the tape, it will make contact with its associated bus-bar connected to battery 26, while if there is no hole in the tape at this position, the finger will remain in contact with its associated bus-bar connected to ground through the winding of control relay 27. At no time will a contact finger on transmitter 21 be in engagement with both bus-bars 28 and 30 simultaneously or will the contact fingers on transmitter 22 be in engagement with both bus-bars 29 and 31 simultaneously. When a contact finger leaves one bus-bar it will immediately make contact with its other associated bus-bar. The receiving tape 20 is run through transmitter 21 and the sending tape 19 through the transmitter 22 and both transmitters are operated in synchronism by vibrating relay 32. Corresponding fingers and corresponding bars of the two transmitters are connected together as shown.

As may readily be seen from the drawing, there will be no flow of current through the control relay so long as corresponding fingers on the two transmitters are connected to corresponding bus-bars. However, if a finger on one transmitter is connected to the battery bus-bar while the corresponding finger on the other transmitter is connected to the ground bus-bar, a current will flow and the control relay will operate and in doing so will complete an obvious circuit from battery through counting magnet 40 to ground. So long as the perforations in the two tapes are alike, corresponding fingers on the two transmitters 21 and 22 will always be connected to corresponding bus-bars, but whenever the perforations differ, the corresponding fingers on the two transmitters will be connected to opposite bus-bars and the counting magnet will be operated to indicate one error.

This much of the circuit would be sufficient to count the errors correctly, if all the signals that started out from the sending end were recorded on the receiving tape. Where a radio channel is employed for transmission, however, there is a possibility, that, due to fading or to certain forms of interference, a complete code group or even several of them may be entirely lost. Since in making the record of the receiving tape the transmitter moves the tape forward only after a signal has been recorded, the complete absence of a signal will leave no record of the omission on the tape, and the first signal received after the omission will appear immediately following the one before the omission. As the result of such an omission the tapes on the two transmitters 21 and 22 would become out of step and all corresponding signals thereafter would differ except for the chance occurrence of similar letters. After such an omission the apparatus of the invention would record a continuous sequence of errors. To indicate the occurrence of such a situation, an additional circuit is required which will stop the comparator and sound an alarm so that the number of characters omitted may be visually counted and the tape may be brought into synchronism again before the comparison is continued. This circuit takes advantage of the fact that such an omitted signal will result in a continuous sequence of errors and therefore provides a selector switch 41 of the stepper type which in the arrangement shown in the drawing, is so connected that after five consecutive errors have been recorded it will stop the comparator and ring a bell 35. The selector switch 41 is operated through stepping magnet 36 and release magnet 37 both of which are connected by obvious operating circuits having a common path to a second armature on the control relay 27. This armature connects to ground when the control relay is operated, and to battery when it is released, and the stepping magnet 36 is connected to battery and the release magnet 37 to ground. As a result the stepping magnet 36 will operate whenever the control relay 27 is operated to count a failure and the release magnet 37 will operate whenever, due to a correspondence of signals on the two tapes, the control relay 27 remains unoperated.

An essential part of the circuit is relay 38 that operates with each pulse sent to the operating magnets 33 and 34 of the tape transmitters. This relay is given a slow-release characteristic by a resistance shunt 39, and thus does not release until a short interval after the operating magnets 33 and 34 of the tape transmitters have released. This relay allows sufficient time for the control relay 27 to operate before the circuit is extended to the stepping magnet 36 of the selector switch.

If, as the fingers are positioned at the release of the operating magnets 33 and 34 of the tape transmitters, a lack of correspondence between the two tapes is found, the control relay 27 will operate and when relay 38 releases immediately thereafter, a circuit will be completed through stepping magnet 36 of the selector switch 41. At the next pulse to the operating magnets 33 and 34, this circuit will be opened at relay 38 until after the fingers have been again positioned. If no error is found at this position, control relay 27 will not operate, and when relay 38 releases battery will be applied to both magnets of selector 41 operating the release magnet 37 through a back contact of the control relay 27 and the selector switch will be returned to normal. If, however, an error existed in this second position also, the stepping magnet 36 would have been operated instead of release magnet 37 by application of ground instead of battery to the selector magnet and the selector would move ahead again.

After five successive forward moves, the selector connects ground to relay 42 which through a front contact rings bell 35 and by opening a back contact breaks the circuit of the operating magnets of the tape transmitters to stop the operation of the transmitters. A transfer on relay 42 disconnects the winding of relay 38 from the operating circuit for the transmitter magnets and connects it to battery causing the armature of relay 38 to lock up and open the back contact thus disconnecting the selector magnets 36 and 37 from the armature of control relay 27. When this happens an attendant may go to the transmitters, inspect the tapes and if the succession of errors was due to the omission of one or more characters, he may synchronize the tapes. The number of characters omitted may then be determined by a visual comparison of the tapes. The comparator may be started again by operation of key 44 which disconnects battery from the winding of relay 42 causing it to release its armatures and restore the pulsing circuit. Operation of key 44 also connects battery to the windings of the selector magnets 36 and 37. Stepping magnet 36 has the other end of its winding connected to battery therefore it gets no current. Release magnet 37 however has the other end of its winding connected to ground and it operates, returning the selector to normal position. Under some circumstances it is desirable to stop the tapes after each error so that the particular impulses mutilated by the interference may be determined. To make this possible key 43 has been provided. When this key is closed, the selector switch will stop the tape transmitters and ring the alarm after each error. The restoring key 44 provides means to release the selector switch and start the tape transmitters 21 and 22 after they have been stopped as described above.

This tape comparator makes it possible to carry on the actual analysis of the sent and received messages while the tests are being made. Besides making it possible to secure transmission information more quickly, the new equipment has greatly reduced the tedious labor required in comparing sent and received copies, and has increased the accuracy of the test results.

What is claimed is:

1. In a signaling system, a testing device comprising a record containing a plurality of signals as originally transmitted, a second record containing the plurality of signals as received after transmission, a plurality of synchronously operated transmitting devices through which said original and said second records may be respectively passed for comparing each of the signals on the received record with its corresponding signal on the record as originally transmitted, a controlling element, an operating circuit and a source of current therefor for said controlling element, a counting device responsive to said controlling element, and means in said operating circuit arranged to operate said controlling element every time any difference exists between any signal on said second record and its corresponding signal on said original record.

2. In a signaling system according to claim 1 wherein said signal records are tapes respectively perforated to indicate signals as originally transmitted and as received.

3. In a signaling system, a testing device comprising a pair of synchronously operated tape transmitters, a signal record of combinations of current impulses arranged to pass through one of said tape transmitters and a second signal record duplicate of the first-mentioned record arranged to pass through the other of said tape transmitters, a control relay and an operating circuit therefor responsive to any differences in corresponding signal combinations on said signal records respectively passing through said test transmitters, and a counting device responsive to said control relay for recording the number of times errors occur in corresponding signal combinations.

4. In a signaling system, a testing device comprising a receiving message tape perforated from the received message and a sending message tape perforated with the message transmitted, a pair of tape transmitters for comparing a code message on said receiving tape with the code message as originally transmitted on said sending tape, a control relay and an operating circuit therefor responsive to said tape transmitters whenever any difference in the corresponding signal combinations on said tapes occurs, a source of frequency for operating said transmitters in synchronism, a timing device responsive to said source of frequency, a stepping device, an operating circuit for said stepping device responsive to each operation of said control relay and said timing device and an alarm device, and a second control relay and operating circuit therefor responsive to one or more predetermined steps of said stepping device for operating said alarm device and preventing the operation of said transmitters after each of the one or more predetermined steps of said stepping device and a restore switch including the operating circuit of said second control relay for restoring said stepping switch to normal whenever desired.

5. In a signaling system, a testing device according to claim 4 wherein the source of frequency is a source of direct current controlled by a relay having a self-interrupting operating circuit and the timing device is a slow-release relay arranged to have a delay factor sufficient to permit the first-mentioned control relay to operate before said operating circuit for said stepping device closes.

6. In a signaling system, a testing device according to claim 4 wherein each of said pair of tape transmitters comprises a plurality of contact fingers responsive to the perforated impulses of a signal combination, a plurality of connections interconnecting corresponding contact fingers on said transmitters and means including certain of said interconnected corresponding contact fingers for closing the operating circuit for said control relay whenever two or more corresponding contact fingers on said transmitters operate to different positions in response to said perforated tapes respectively moving through said transmitters.

7. A method of determining by an automatically operating testing instrumentality the effectiveness of a transmission system which comprises transmitting from a permanent and reusable record, a test message, recording said message as transmitted over said system, running said records simultaneously through the testing instrumentality, and causing said instrumentality to make a count of significant discrepancies between said records.

8. A method of determining by an automatically operating testing instrumentality the effectiveness of a transmission system which comprises preparing a permanent and reusable record of a message in a permutation code, transmitting said message in permutation code from said prepared record, recording said message as transmitted over said system, running said prepared record and the record as received after transmission over said system simultaneously through the testing instrumentality and causing said testing instrumentality to make a count of significant discrepancies between the permutation code message as prepared at the sending end of said system and the permutation code message as recorded at the receiving end of said system.

AUSTIN BAILEY.
THOMAS ADDISON McCANN